Figure 1:
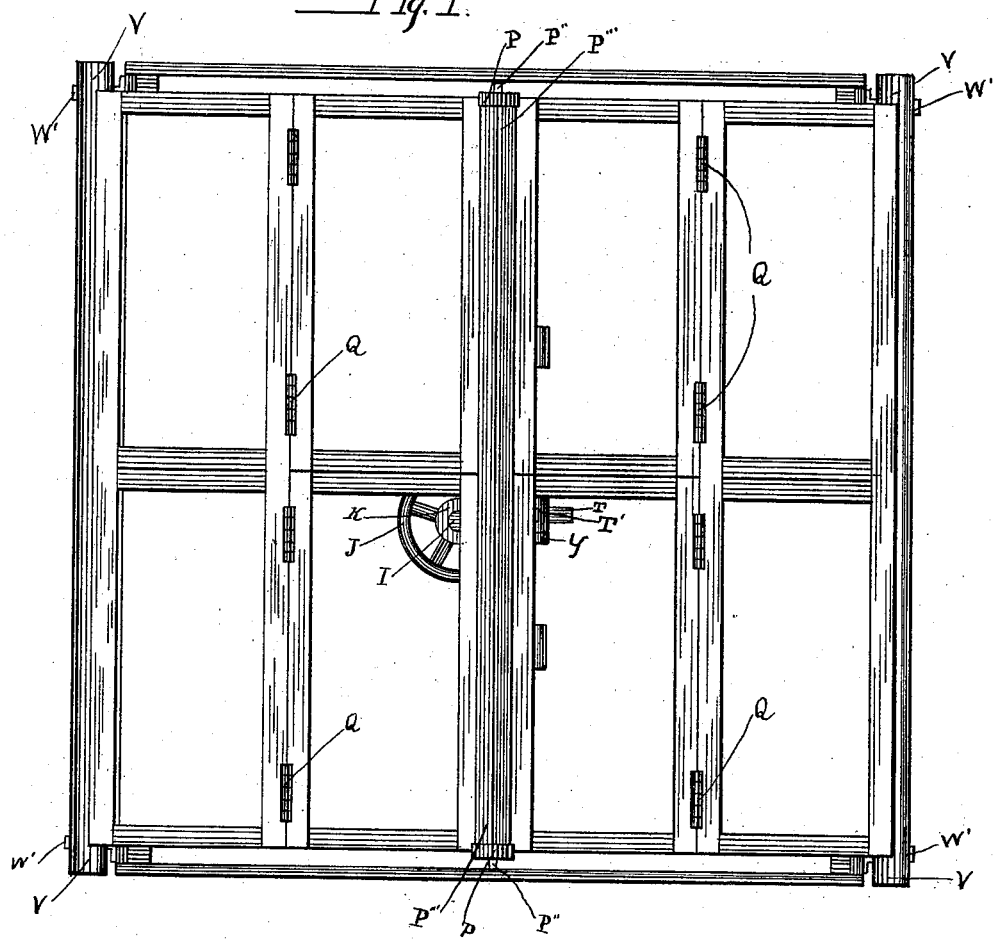

(No Model.)

W. H. DIVEN.

DEVICE FOR OPERATING THE VENTILATING FRAMES OF HOT HOUSES.

No. 372,746. Patented Nov. 8, 1887.

Witnesses
R. A. Balderson
G. S. Cooper

Inventor:
Wm. H. Diven
By J. H. Adriaans
His Attorney.

(No Model.) 7 Sheets—Sheet 2.

W. H. DIVEN.
DEVICE FOR OPERATING THE VENTILATING FRAMES OF HOT HOUSES.

No. 372,746. Patented Nov. 8, 1887.

Witnesses:
R. A. Balderson
W. B. Voute

Inventor.
Wm. H. Diven
By J. H. Adriaans
His Attorney.

(No Model.)

7 Sheets—Sheet 3.

W. H. DIVEN.
DEVICE FOR OPERATING THE VENTILATING FRAMES OF HOT HOUSES.

No. 372,746.

Patented Nov. 8, 1887.

(No Model.)

7 Sheets—Sheet 4.

W. H. DIVEN.
DEVICE FOR OPERATING THE VENTILATING FRAMES OF HOT HOUSES.

No. 372,746. Patented Nov. 8, 1887.

Witnesses:
R. A. Balderson
J. W. Diven.

Inventor:
Wm. H. Diven
By J. H. Adriaans.
His Attorney.

(No Model.)
7 Sheets—Sheet 5.
W. H. DIVEN.
DEVICE FOR OPERATING THE VENTILATING FRAMES OF HOT HOUSES.
No. 372,746.
Patented Nov. 8, 1887.
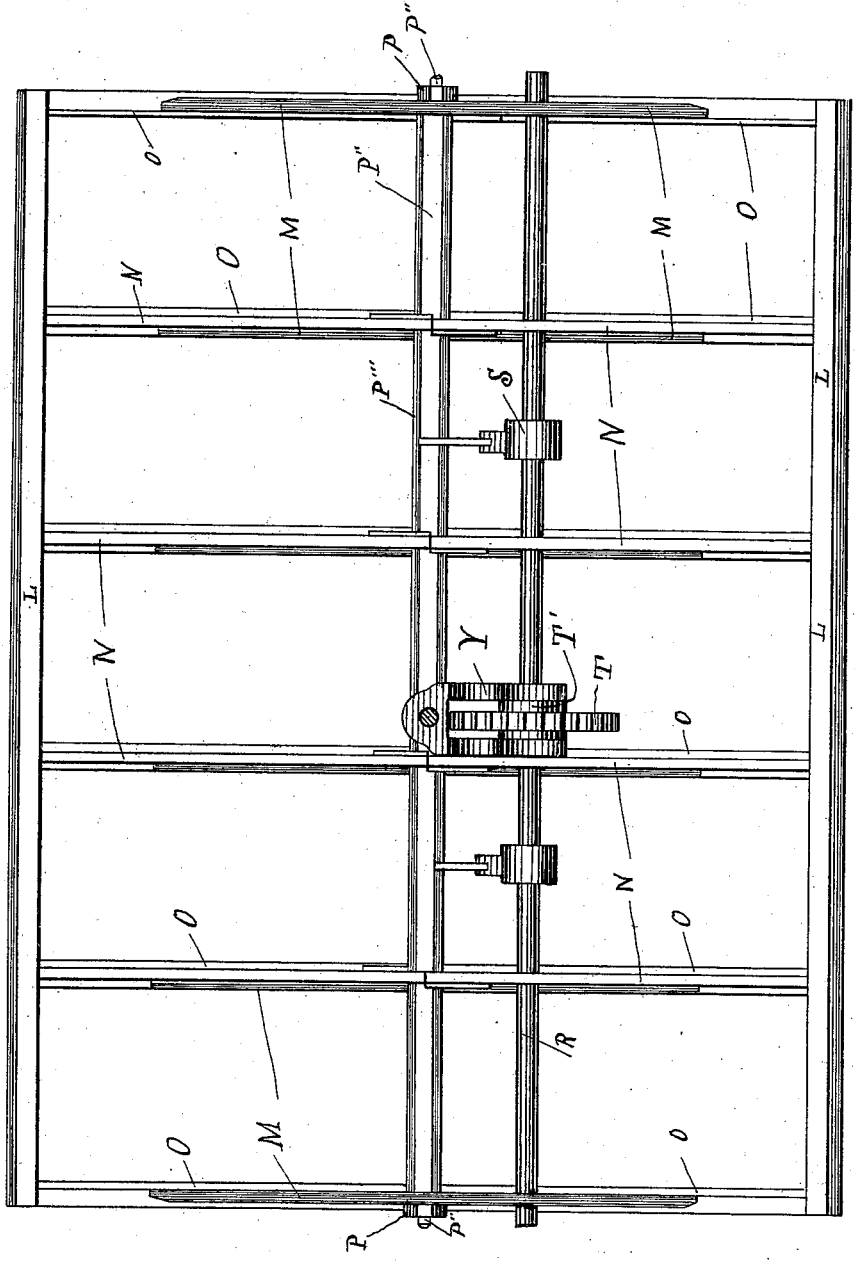
Witnesses:
R. A. Balderson
J. H. Diven.
Inventor:
Wm. H. Diven
By J. H. Adriaans
His Attorney.

(No Model.)
7 Sheets—Sheet 6.
W. H. DIVEN.
DEVICE FOR OPERATING THE VENTILATING FRAMES OF HOT HOUSES.
No. 372,746. Patented Nov. 8, 1887.
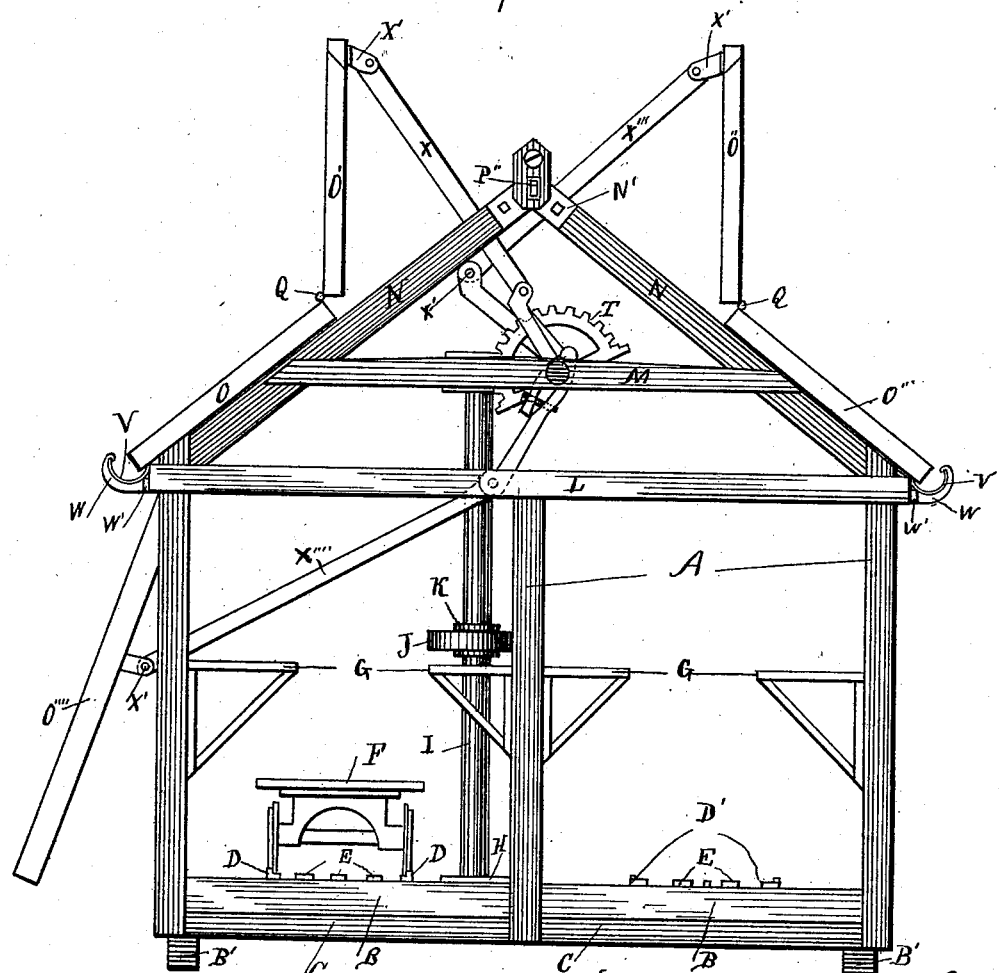
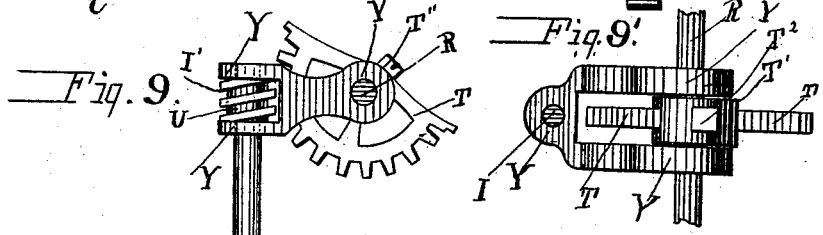
Witnesses:
R. A. Balderson.
J. W. Diven.
Inventor:
Wm. H. Diven
By J. H. Adriaans
His Attorney.

(No Model.) 7 Sheets—Sheet 7.

W. H. DIVEN.
DEVICE FOR OPERATING THE VENTILATING FRAMES OF HOT HOUSES.

No. 372,746. Patented Nov. 8, 1887.

Witnesses:
R. A. Balderson
J. W. Diven

Inventor:
Wm. H. Diven
By J. N. Adriaans
His Attorney

UNITED STATES PATENT OFFICE.

WILLIAM H. DIVEN, OF LAUREL, MARYLAND.

DEVICE FOR OPERATING THE VENTILATING-FRAMES OF HOT-HOUSES.

SPECIFICATION forming part of Letters Patent No. 372,746, dated November 8, 1887.

Application filed June 4, 1887. Serial No. 240,210. (No model.)

*To all whom it may concern:*

Be it known that I, WILLIAM HENRY DIVEN, of Laurel, in the county of Prince George's and State of Maryland, have invented certain new and useful Improvements in Ventilating Devices; and I do hereby declare that the following is a full, clear, and exact description thereof, reference being had to the accompanying drawings, and to the letters of reference marked thereon, which form part of this specification.

My invention relates to devices for operating the ventilating-frames of hot-houses; and its objects are, first, to effect a synchronous movement of the ventilators; second, to accomplish this object from the floor, or an equally-convenient position, of the house, regardless of the number or location of the ventilators; third, to provide for temporarily incapacitating some of the ventilators while the others respond to the common source of power; fourth, to minimize the amount of power requisite to operate all the ventilators, irrespective of their weight or position; fifth, to construct the parts relatively to each other, so that the apparatus shall be durable and the operation uniform; sixth, to attain these ends with structural simplicity or economy. I accomplish these aims by the devices and mechanism illustrated in the accompanying drawings, in which—

Figure 2:
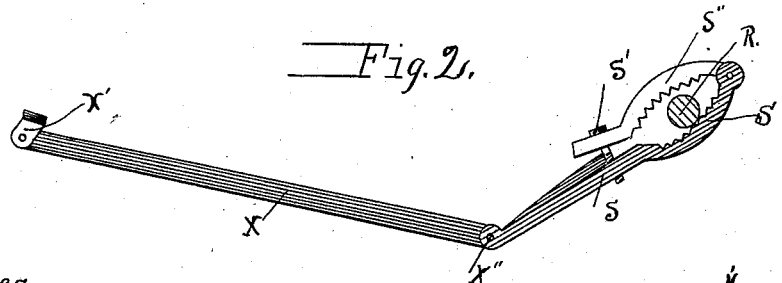
Figure 3:
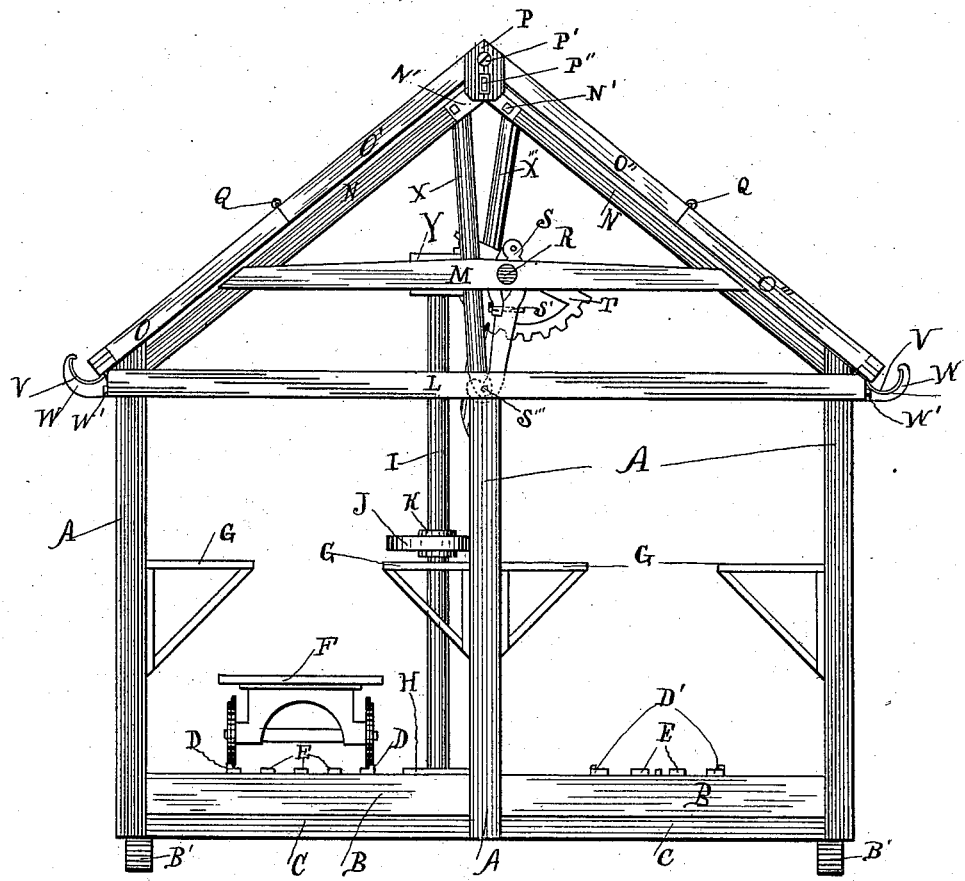
Figure 4:
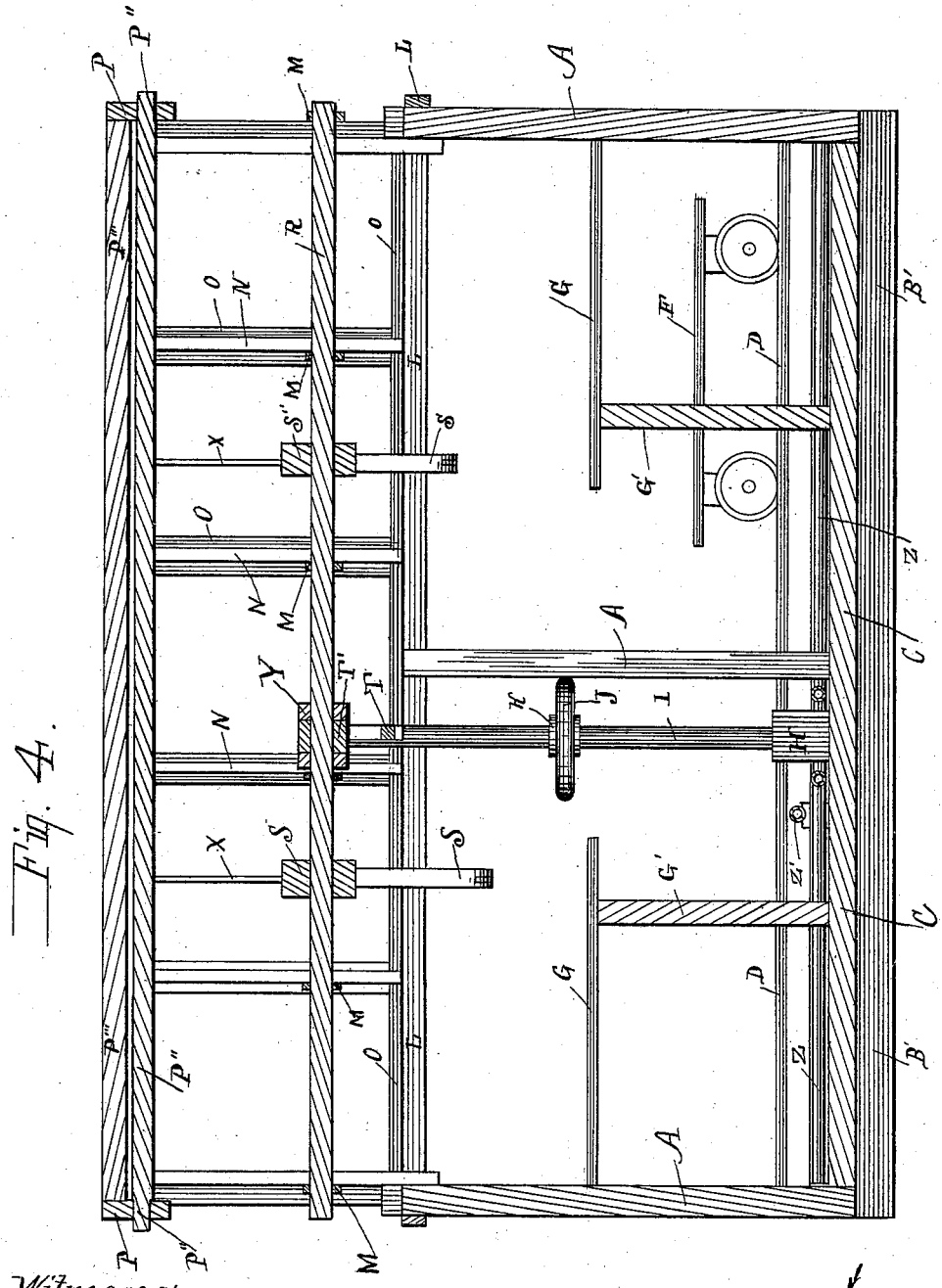
Figure 5:
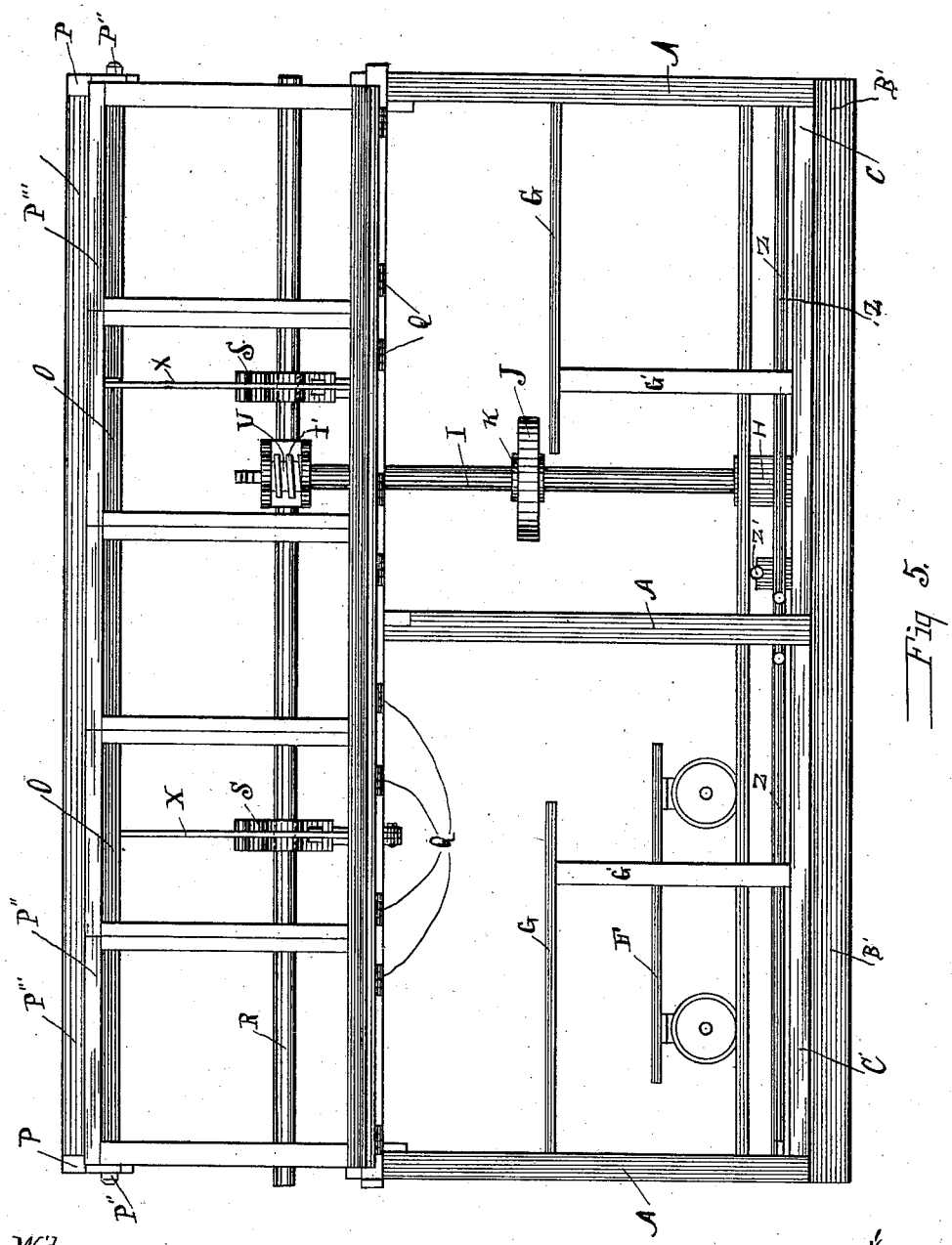
Figure 8:
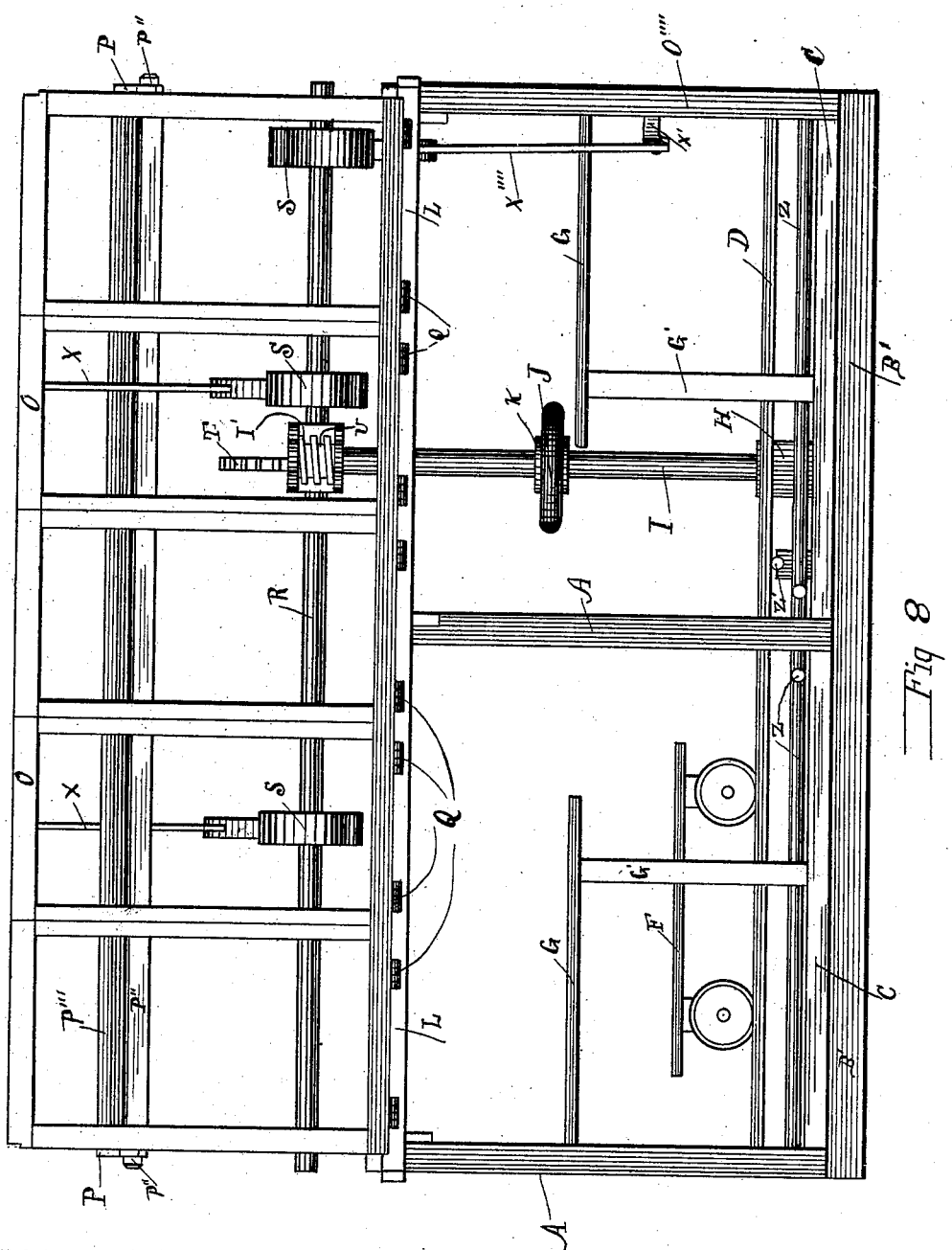

Figure 1 represents a plan view of a hot-house provided with my ventilating system. Fig. 2 is a detail view of the toggle-arm through which the ventilators are reciprocated by the central power. Fig. 3 represents a front elevation of the hot-house. Fig. 4 shows a transverse section of the hot-house having my improvements embodied therein. Fig. 5 is a side elevation of the hot-house. Fig. 6 represents a plan view thereof, showing its construction and the correlation of the parts. Fig. 7 shows a front elevation of the hot-house having the ventilators opened or extended. Fig. 8 is a side elevation of the hot-house under the same conditions, and Figs. 9 9' indicate detail views of the mechanism for operating the ventilators.

The same designations indicate corresponding parts in all the views.

Upon the floor C, sustained by the sills B', a suitable structure of iron or wood, or both, is erected, provided with the ordinary steam-pipes, Z, hot and cold water pipes Z', floor E, supported on joists B, and with or without the tracks D D', upon which a common trolley, F, runs for conveying the plants into and out of the hot-house, and the usual slate or wooden ledges or brackets, G, sliding on supports G', whereon the plants and flowers rest. Braces L M sustain the rafters N, held to the ridgepole P'' by bolts N', whereon the glass frames O O' O'' O''', provided with hinges Q, are supported.

The glass frames O O' O'' O''' can either be centrally hinged, as shown in Figs. 1, 3, and 7, or they can be terminally hinged to the brace L, as shown in Figs. 5 and 8. Near the middle frame-post, A, a spindle, I, stepped in a bed-piece, H, and supported at its upper terminus in the yoked collar Y, rotates. Approximately in the center a washer, K, surrounds the spindle, and a hand-wheel, J, is rigidly fitted thereon, so that the former will share the imparted rotation of the latter. The spindle I has a worm, I', cut in a concentric drum, V, on its upper end, which meshes with the toothed segment T, whose hub T' encircles the shaft R, its binding contact therewith being regulated by a set-screw, T''. The yoked collar Y, held in place by washers, prevents the hub T' from sliding on the shaft R, whereby motive contact of the segment T and worm I' is maintained. The shaft R is surrounded by a series of serrated clamps, S, having pivoted jaws S'', whose angle is determined by the set-screw S'. Thus in Fig. 2 the rotation of the shaft R would cause no corresponding movement of the clamp S and its connected toggle-arm X, whereas in Fig. 7 they would necessarily move synchronously.

The toggle-arms X X''' X'''' are pivoted at X'', and are provided with terminal flanges X', whereby they are connected to the frames O' O'' O''''. Therefore, when the clamp S firmly binds the shaft R, the latter's rotation, due to the revolution of the hand-wheel J, will oscillate the toggle-arms X X''' X'''', and consequently will raise the attached frames O' O'' O''''; or, if desired, the clamp S of the toggle-arms X''' or X'''' can be set loose, as shown in Fig. 2, whereby the corresponding ventilator will be temporarily idle.

The ridge-pole P'' sustains the ends of the rafters N, and a beveled ridge-pole, P''', superposes the pole P'', being held in place by uprights P and bolts P'. The pole P''' is beveled on both sides with rubber lining, so that the ventilators will be snugly accommodated and leakage of water prevented. It will therefore be apparent that by a common source of power all the ventilators can simultaneously be raised or lifted to any extent, and conversely, and the degree of requisite force is comparatively small and easily applied.

Having thus fully described my invention, what I claim, and desire to secure by Letters Patent of the United States, is—

1. The hinged ventilators, in combination with the toggle-arms, the serrated clamps connected thereto, the horizontal shaft having the toothed segment, and the vertical spindle provided with a worm meshing with said segment, and having also a central hand-wheel for rotating said spindle, whereby the ventilators are simultaneously and synchronously operated.

2. The hinged frames O' O'' O'''' of the ventilators, in combination with the toggle-arms X X''' X'''', having flanges X' and pivots X'', the serrated clamps S, having pivoted jaws S'' and set-screws S', the horizontal shaft R, sustaining the clamps S, and the toothed segment T, whose binding contact with said shaft is varied by the set-screw T'', the yoked collar Y, which serves the duplex purpose of a bearing for the spindle I and a restraining agent to the hub T', and the vertical spindle I, provided with a worm, I', that meshes with said segment, and having also a central hand-wheel, J, for rotating the spindle, for the purpose herein fully shown and described.

In testimony that I claim the foregoing as my own I affix my signature in presence of two witnesses.

WM. H. DIVEN.

Witnesses:
J. H. ADRIAANS,
M. DORIAN.